(12) United States Patent
Kodama

(10) Patent No.: US 9,218,478 B2
(45) Date of Patent: Dec. 22, 2015

(54) MICROCOMPUTER, MIDDLEWARE, AND OPERATING METHOD FOR THE SAME

(71) Applicant: SOCIONEXT INC., Yokohama-shi, Kanagawa (JP)

(72) Inventor: Yuko Kodama, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 111 days.

(21) Appl. No.: 14/097,441

(22) Filed: Dec. 5, 2013

(65) Prior Publication Data

US 2014/0173718 A1  Jun. 19, 2014

(30) Foreign Application Priority Data

Dec. 19, 2012  (JP) .................. 2012-277002

(51) Int. Cl.
 *G06F 21/00* (2013.01)
 *G06F 21/44* (2013.01)
(52) U.S. Cl.
 CPC ...................... *G06F 21/44* (2013.01)
(58) Field of Classification Search
 CPC .......................................... G06F 21/44
 USPC ........................................... 726/19
 See application file for complete search history.

(56) References Cited

U.S. PATENT DOCUMENTS

| | | | | |
|---|---|---|---|---|
| 6,188,995 | B1 * | 2/2001 | Garst et al. ....................... 705/59 |
| 6,571,335 | B1 * | 5/2003 | O'Donnell .............. G06F 21/64 713/156 |
| 2005/0005131 | A1 * | 1/2005 | Yoshida ................... G06F 21/31 713/183 |
| 2007/0112446 | A1 * | 5/2007 | Deveaux et al. ................ 700/83 |
| 2007/0217614 | A1 | 9/2007 | Fujiwara et al. |
| 2008/0083016 | A1 * | 4/2008 | Itoh ................................... 726/2 |
| 2010/0077473 | A1 * | 3/2010 | Ohta ....................... G06F 21/53 726/17 |
| 2012/0159617 | A1 * | 6/2012 | Wu ....................... G06F 21/445 726/19 |

FOREIGN PATENT DOCUMENTS

JP  2004-164491  6/2004

* cited by examiner

*Primary Examiner* — Izunna Okeke
*Assistant Examiner* — Ali Shayanfar
(74) *Attorney, Agent, or Firm* — Staas & Halsey LLP

(57) ABSTRACT

A microcomputer has a processing unit; a plurality of registers; a storage storing hardware initialization data that includes an initial value and a register address in which the initial value is set, the processing unit performing a process including: setting the initial value in a register having the register address based on the hardware initialization data; performing a functional capability limitation releasing processing to determine whether authentication data in an authentication register, which is selected in advance from the plurality of registers, is correct based on an authentication information for releasing limitations on a functional capability of a function, and to put a function corresponding to the authentication information into an executable state when the authentication data is correct; and executing the function which is put into the executable state to realize the functional capability of the executed function.

7 Claims, 11 Drawing Sheets

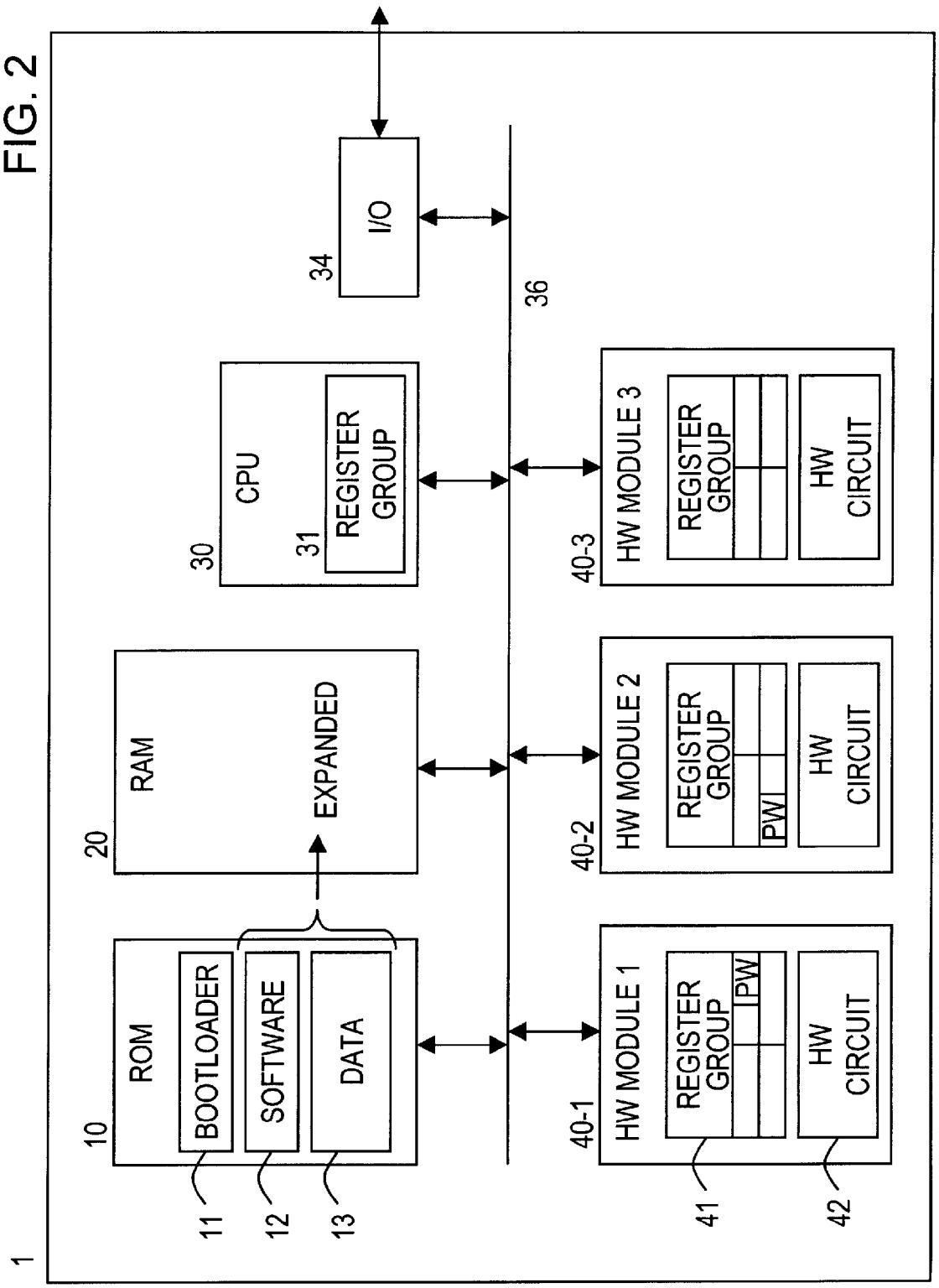

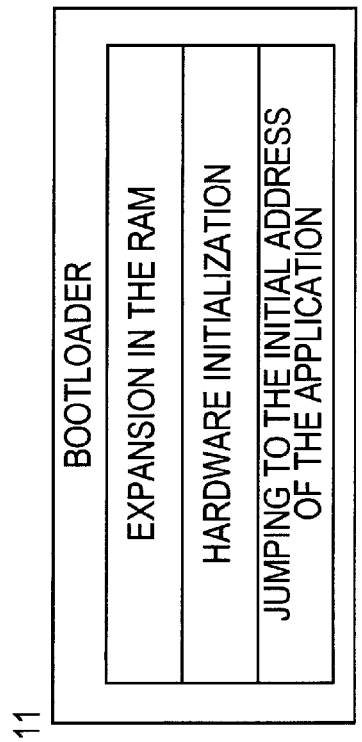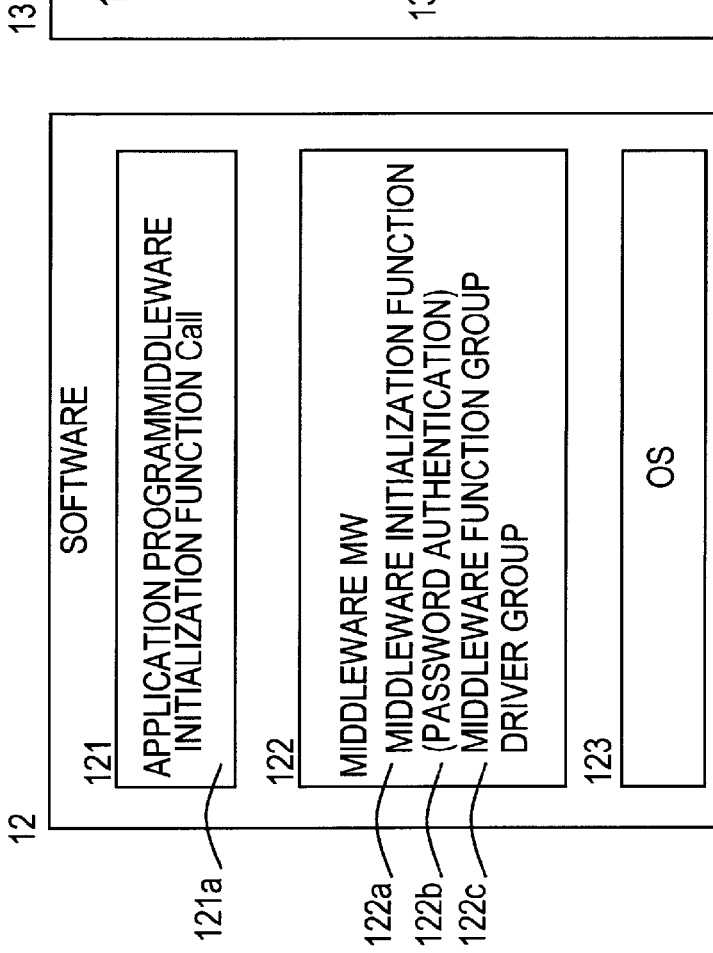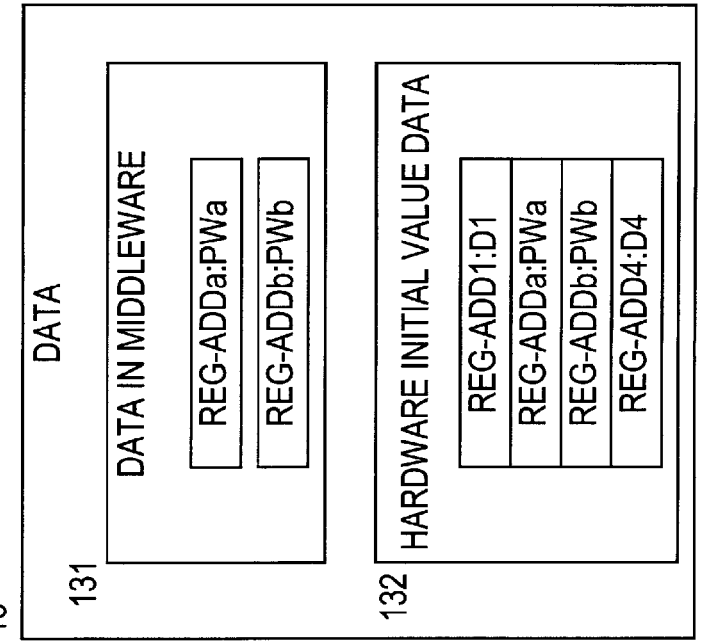

FIG. 8A

HARDWARE REGISTER GROUP

| REG-ADD | DATA | |
|---|---|---|
| ADD1 | INITIAL VALUE AREA | |
| ADD2 | INITIAL VALUE AREA | |
| ADD3 | INITIAL VALUE AREA | |
| ADDa | INITIAL VALUE AREA | ARBITRARILY SELECTABLE |
| ADDb | ARBITRARILY SELECTABLE | |
| ADDc | INITIAL VALUE AREA | ARBITRARILY SELECTABLE |
| ADDd | ARBITRARILY SELECTABLE | |
| ...... | | |

FIG. 8B

HARDWARE INITIALIZATION PROCESSING

USER INITIAL VALUE | PW  →

| DATA | |
|---|---|
| USER INITIAL VALUE | |
| USER INITIAL VALUE | |
| USER INITIAL VALUE | |
| USER INITIAL VALUE | PWa |
| PWb | |
| USER INITIAL VALUE | |
| ...... | |

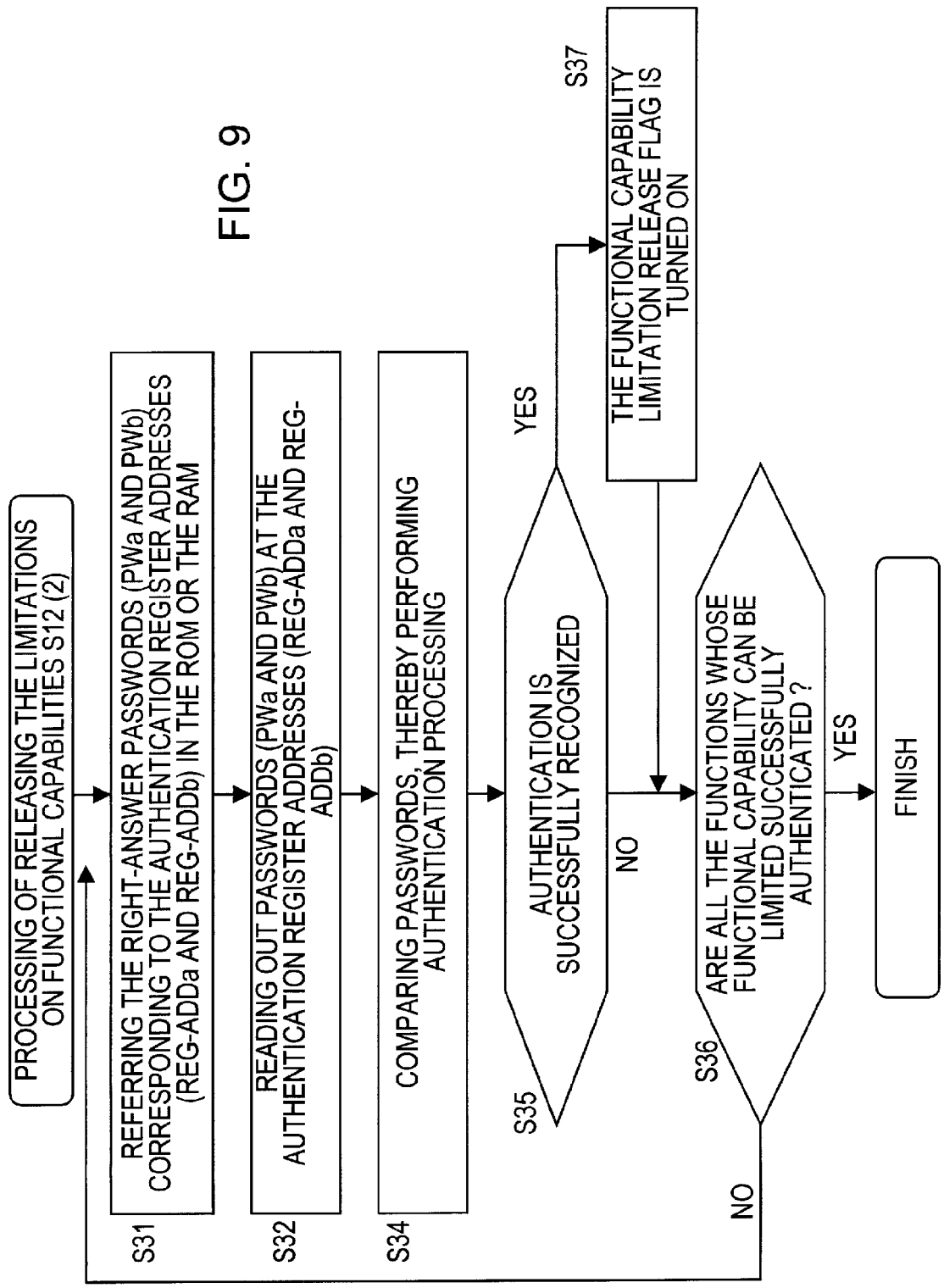

MICROCOMPUTER, MIDDLEWARE, AND OPERATING METHOD FOR THE SAME

CROSS-REFERENCE TO RELATED APPLICATION

This application is based upon and claims the benefit of priority of the prior Japanese Patent Application No. 2012-277002, filed on Dec. 19, 2012, the entire contents of which are incorporated herein by reference.

FIELD

The present invention relates to a microcomputer, middleware, and an operating method for the same.

BACKGROUND

In a microcomputer, a CPU (Central Processing Unit) executes programs embedded in a built-in ROM (Read-only Memory) and realizes desired functional capabilities. In addition to the ROM in which the programs are embedded, the microcomputer includes CPUs, RAMs (Random Access Memory), and input-output units (I/O) and further includes several hardware modules.

Various functions or functional capabilities (hereinafter merely referred to as "functional capability") are provided in the microcomputer, whereby the user of the microcomputer realizes the desired processing with use of these functional capabilities. For example, the application program developed by the user calls and executes a variables-involved function or subroutine (hereinafter merely referred to as "function") which realizes the desired functional capabilities, thereby utilizing the desired functional capabilities.

On the other hand, under the development environment of the microcomputer, the application program that is developed by the user, along with OS (Operating System) and middleware that are supplied by a vendor of the microcomputer, is written into a memory in evaluation microcomputer chips, thereby allowing the microcomputer to execute the application program under development.

Under the development environment, the vendor often limits the functional capabilities of the microcomputer in such a manner that part of the functional capabilities of the microcomputer are unable to be utilized and supplies library including the aforementioned functions and the evaluation microcomputer chip to the user. For example, the vendor limits the functional capabilities in such a manner that the functions in part of the library are unable to be utilized. Then, under the evaluation environment in which the functional capabilities are limited, the user executes the application under development and evaluates the microcomputer and the library. Thereafter, when the user concludes licensing agreements with the vendor, the vendor releases the limitation on the functional capabilities to allow the user to utilize all the functional capabilities.

The encrypted programs in LSI (Large Scale Integration) are disclosed by Patent Document 1 (Japanese Unexamined Patent Application Publication No. 2004-164491).

However, when the vendor supplies the library, in which the functional capabilities are limited, to the user, and supplies another library, in which the functional capabilities are not limited, to the user after the conclusion of licensing agreements, the vendor are demanded to provide two types of library for the user, which causes an increase in types of library. Also, it is demanded that the user replaces the library, in which the functional capabilities are limited, with the library, in which the functional capabilities are not limited.

SUMMARY

One aspect of the embodiment is a microcomputer comprising: a processing unit; a plurality of registers; and a storage medium configured to store hardware initialization data that includes an initial value and a register address in which the initial value is set, the processing unit being configured to perform a process including:

setting the initial value in a register having the register address based on the hardware initialization data;

performing a functional capability limitation releasing processing to determine whether authentication data in an authentication register, which is selected in advance from the plurality of registers, is correct based on an authentication information for releasing limitations on a functional capability of a function, and to put a function corresponding to the authentication information into an executable state when the authentication data is correct; and executing the function which is put into the executable state to realize the functional capability of the executed function.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a configuration diagram of the microcomputer of the embodiment.

FIG. 3 is a diagram illustrating the bootloader, the software, and the data of the embodiment.

FIGS. 8A and 8B are diagrams illustrating the hardware register group and the hardware initialization processing.

FIG. 9 is a flowchart of the processing of releasing the limitations on functional capabilities in the embodiment.

DESCRIPTION OF EMBODIMENTS

Figure 1:
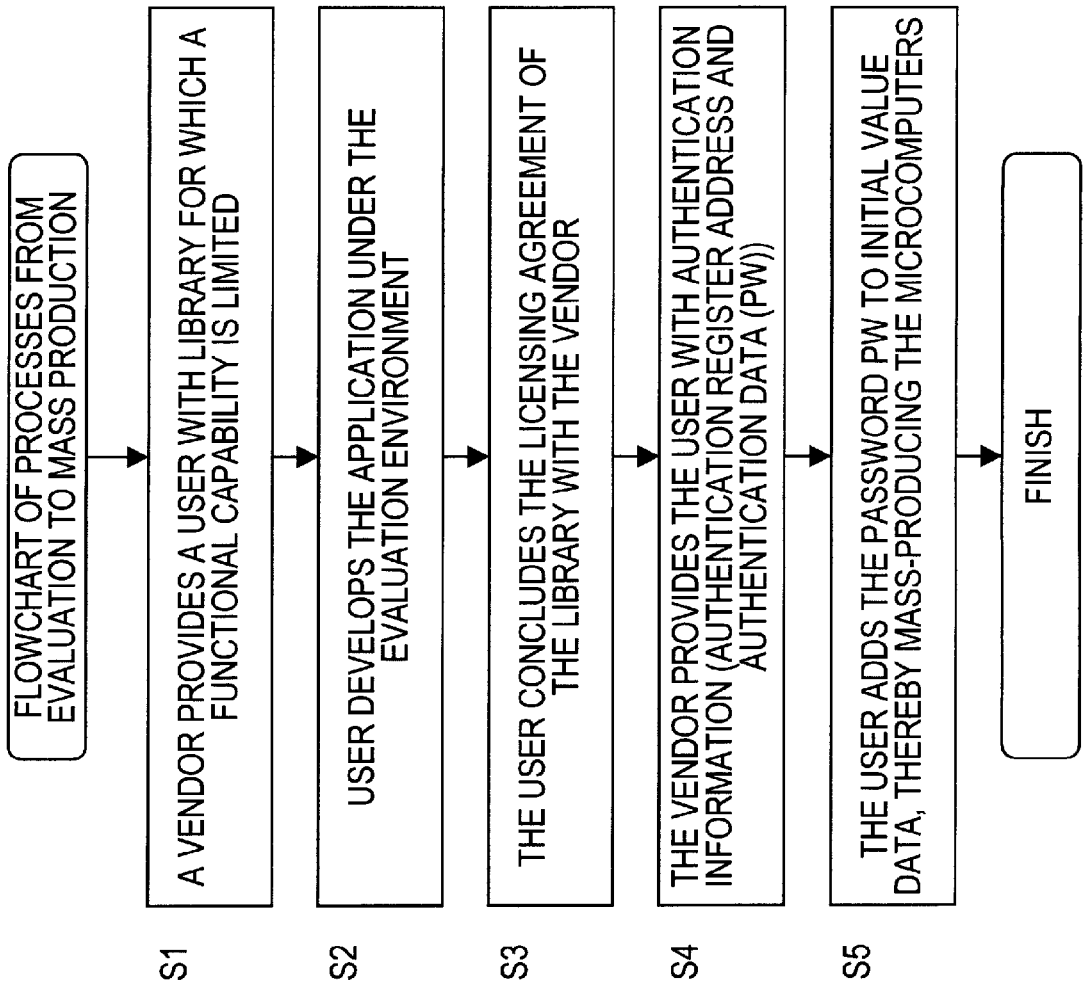
FIG. 1 is a flowchart illustrating the processes from evaluation to mass production of a microcomputer of the embodiment.

FIG. 1 is a flowchart illustrating the processes from evaluation to mass production of a microcomputer of the embodiment. Steps S1 and S2 represent the evaluation stage of the microcomputer, and Steps S3, S4, and S5 represent the stage leading to the mass production of the microcomputer. On the evaluation stage, a vendor provides a user with library in which part of functional capabilities are limited (S1). Herein, the library is middleware interposed between OS and applications. Also, the library includes data for the middleware and the like.

The microcomputer includes a CPU and storage media such as a ROM and a RAM and stores the OS, the middleware, application programs (hereinafter simply referred to as "application"), and data in the storage media, and allows the CPU to execute the application, thereby realizing desired processing with the use of various functional capabilities. Generally, the application calls functions corresponding to various functional capabilities in the middleware, whereby the functions to be called are executed so as to realize the corresponding functional capabilities.

Accordingly, the middleware (library) in which part of functional capabilities are limited means middleware in a state where part of functions are not executable.

The user develops the application under the evaluation environment and simultaneously evaluates the microcomputer and the library (S2). Under the evaluation environment, a microcomputer to be evaluated is connected to a personal computer via an ICE (in-circuit emulator), and the aforementioned OS, the middleware, the application, and data under development are stored in a memory of the microcomputer to be evaluated in an executable format via the personal computer. Then, the microcomputer to be evaluated executes the application, and the user monitors and evaluates the operation states of the microcomputer on the personal computer.

When the evaluation result of the microcomputer is favorable, the user concludes the licensing agreement of the library with the vendor (S3). The licensing agreement allows the user to obtain the library in which the functional capabilities to be licensed are available, and allows the microcomputer to use the functional capabilities to be licensed. The vendor provides the user with a password as authentication information (authentication data), which is aimed at allowing the user to use the library (S4). The authentication information includes the address of an authentication register set in advance, out of a plurality of registers in the microcomputer and passwords (authentication data) which need to be initially set in the authentication register.

In contrast, upon the activation of the microcomputer, a bootloader sets initial values in the plurality of registers in the microcomputer. The authentication register is arbitrarily selected by the vendor from the registers except the register in which the initial values are set. That is, the authentication register is arbitrarily selected from a sort of redundant registers in which the initial values are not set until the application is executed, or in which arbitrary data may be stored. The redundant register is a register which is not employed during the hardware initialization of the microcomputer.

Subsequently, the user adds the password that is provided by the vendor as initial value data that will be set in the authentication register at the time of hardware initialization processing, thereby mass-producing the microcomputers (S5). A functional capability limitation release unit in the microcomputer verifies whether the password (authentication data) set in the predetermined authentication register is correct. When the functional capability limitation release unit verifies that the password is correct, the functions to realize the functional capabilities are set in an executable state.

Thus, in the embodiment, in order to utilize the various functional capabilities of the microcomputer, it is demanded to obtain the authentication information to release the limitations on functional capabilities (address of authentication register and password (authentication data)), thereby putting the functions corresponding to the functional capabilities into the executable state. Accordingly, when the vendor desires to limit a certain functional capability, the vendor does not provide the user with the address of the authentication register and the password (authentication data) to be set in the authentication register. Consequently, the user is unable to use the certain functional capability. Then, the vendor provides the authentication information (address of authentication register and password (authentication data)) for only the user who concludes the licensing agreement with the vendor. Accordingly, the user can set the password in the authentication register in the microcomputer as the initial value based on the provided authentication information and can put the functions, which are limited to the microcomputer, in the executable state.

As is described above, the address of authentication register and its password corresponding to the various functional capabilities are kept confidential, thereby the vendor provides the user with the library whose functional capabilities are limited with high security. When the limitations on functional capabilities are set based on the verification of a password having predetermined bits, there is a case where a malicious user tries all conceivable predetermined bits and releases the limitation on functional capabilities. In contrast, according to the embodiment, the authentication register to which the password needs to be set is arbitrarily selected in advance from a magnitude of registers, and the address of the authentication register is kept confidential, so that the authentication information includes the address of authentication register for the user, in addition to the password, which makes it significantly difficult to release the limitation on functional capabilities.

FIG. 2 is a configuration diagram of the microcomputer of the embodiment. A microcomputer 1 includes a memory 10 such as the ROM, a RAM 20, a CPU 30, an input/output circuit 34, three sets of hardware modules 40-1, 40-2, and 40-3, all of which are connected via an internal bus 36. A bootloader 11, software 12, data 13 are stored in the ROM 10. The software 12 and the data 13 are expanded in the RAM 20 by the bootloader 11 that is executed by the CPU 30 upon the activation of the microcomputer 1. The CPU 30 includes a register group 31 and an arithmetic unit not illustrated.

On the other hand, the hardware module 40-1 includes a register group 41 that includes a plurality of registers, and a hardware circuit 42 corresponding to the hardware module. Another hardware modules 40-2 and 40-3 have the configuration similar to that of the hardware module 40-1. The hardware modules, for example, include an image processing module for processing image data, a communications module for performing the processing of communication with the outside, an audio module for processing audio data, and a security module for performing the processing regarding security. The microcomputer realizes various functional capabilities based on the combination of the aforementioned hardware modules.

The register groups in the hardware modules and the CPU include the plurality of registers, and an initial value is set in part of the registers at the time of hardware initialization processing. The authentication register to set the password is selected from the registers except the register in which the initial value is set in the hardware initialization processing. The selection is made by the vendor. As is illustrated, a password PW is set in the authentication register to be selected.

In the example of FIG. 2, the register group 41 in respective hardware modules 40-1, 40-2, and 40-3 includes four sets of registers. Then, the lower-order bit area of one register in the hardware module 40-1 and the higher-order bit area of one register in the hardware module 40-2 are combined, thereby constituting one authentication register. In correspondence to this, one password PW that is divided in two is set into the register areas. That is, two divided passwords PW are combined, thereby constituting one authentication password.

Needless to say, it may be selected such that all the bits of the password PW are set in one authentication register, or the password PW is set in all the bits of the plurality of registers.

Next, the bootloader 11, the software 12, and the data 13 in the ROM 10 will be described.

FIG. 3 is a diagram illustrating the bootloader, the software, and the data of the embodiment. The bootloader 11 includes processing such as processing for expanding the software 12 and data 13 in the ROM 10 into the RAM 20 at the time of activation of the microcomputer, hardware initialization processing for setting the initial value data in the registers of the hardware modules, and processing for jumping to the initial address of the application after the completion of all the processing of the bootloader.

The software 12 includes an application program 121 that is mainly developed by the user, middleware 122, and OS 123. Processing 121a for calling a middleware initialization function is provided at the initial address of the application program 121. Accordingly, when the processing for jumping to the initial address of the application program 121 is performed after the bootloader has completed all the processing, the middleware initialization function is called.

The middleware 122 includes an initialization function 122a for initializing the middleware, a middleware function group 122b, and a driver group 122c for executing OS. Further, in the embodiment, the middleware initialization function 122a includes processing for verifying the password PW and releasing the limitations on functional capabilities. However, the processing of releasing the limitations on functional capabilities is not necessarily included in the middleware initialization function, but may be carried until the function group being limited the functional capabilities in the middleware is called from the application.

The data 13 includes data 131 in the middleware and initial value data 132 of the registers in the hardware. The data 131 in the middleware includes the authentication information that includes the address of the authentication register and the passwords to be set in the authentication register In the example illustrated in FIG. 3, the data 131 in the middleware includes authentication register addresses REG-ADDa and REG-ADDb and passwords PWa and PWb to be set in the authentication register. The passwords PWa and PWb, which are set at the authentication register addresses REG-ADDa and REG-ADDb included in the data 131 of the middleware, are as right-answer data, which is included in the library provided by the vendor of the microcomputer, along with the middleware 122. Then, when the middleware initialization function 122a performs the processing of releasing the limitations on functional capabilities, the data 131 in the middleware is referred, it is verified whether the password in the authentication register corresponds to a password included in the data 131.

Also, the hardware initial value data 132 includes user initial value data D1 and D4 that is set at the register addresses REG-ADD1 and REG-ADD4 and the passwords PWa and PWb that are set at the authentication register addresses REG-ADDa and REG-ADDb. The authentication register addresses REG-ADDa and REG-ADDb and the passwords PWa and PWb that are set at the authentication register addresses are requisite information to release the limitation on functional capabilities. This information, for example, is the passwords PWa and PWb with respect to two corresponding functional capabilities, and the authentication register addresses REG-ADDa and REG-ADDb at which the passwords PWa and PWb are initialized. Accordingly, when the vendor desires to limit the functional capabilities, the vendor does not provide the user with the authentication information. When the vendor does not limit the functional capabilities, the vendor provides the user with the authentication information.

Figure 4:
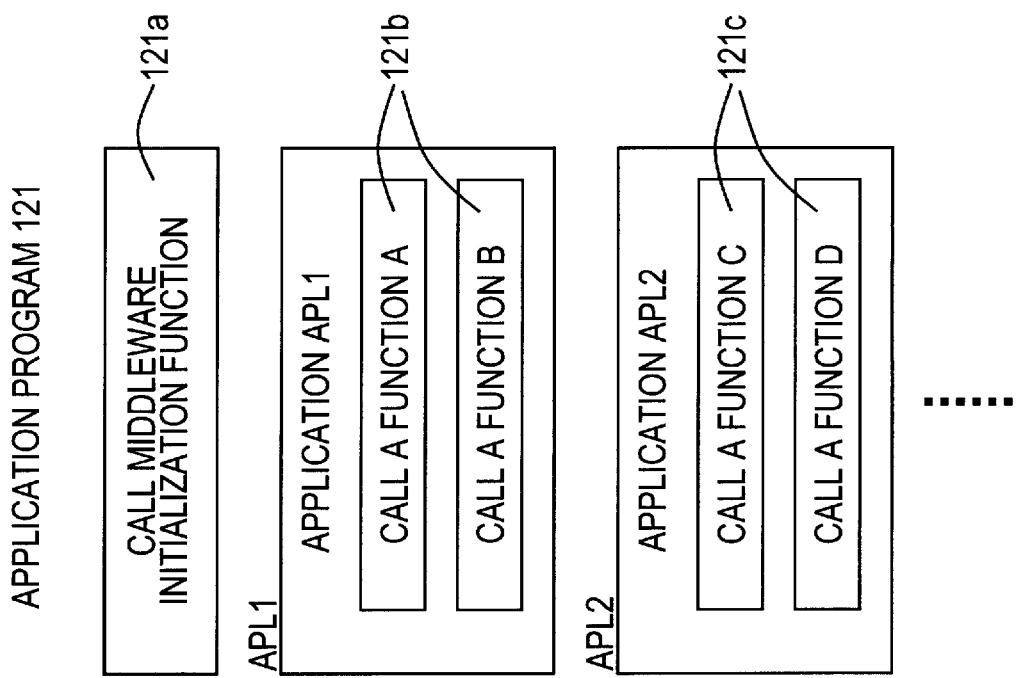
FIG. 4 is a diagram illustrating the example of the configuration of the application program 121 of the embodiment.

FIG. 4 is a diagram illustrating the example of the configuration of the application program 121 of the embodiment. A command 121a to call the middleware initialization function is provided at the initial address of the application 121. Further, the application 121 includes a single or plural applications APL. For example, the application APL1 includes commands 121b to call a function A and a function B in the middleware. In contrast, the application APL2 includes commands 121c to call a function C and a function D. Thus, the command 121a to call the middleware initialization function that each application calls, is provided at the initial address of the application 121.

Figure 5:
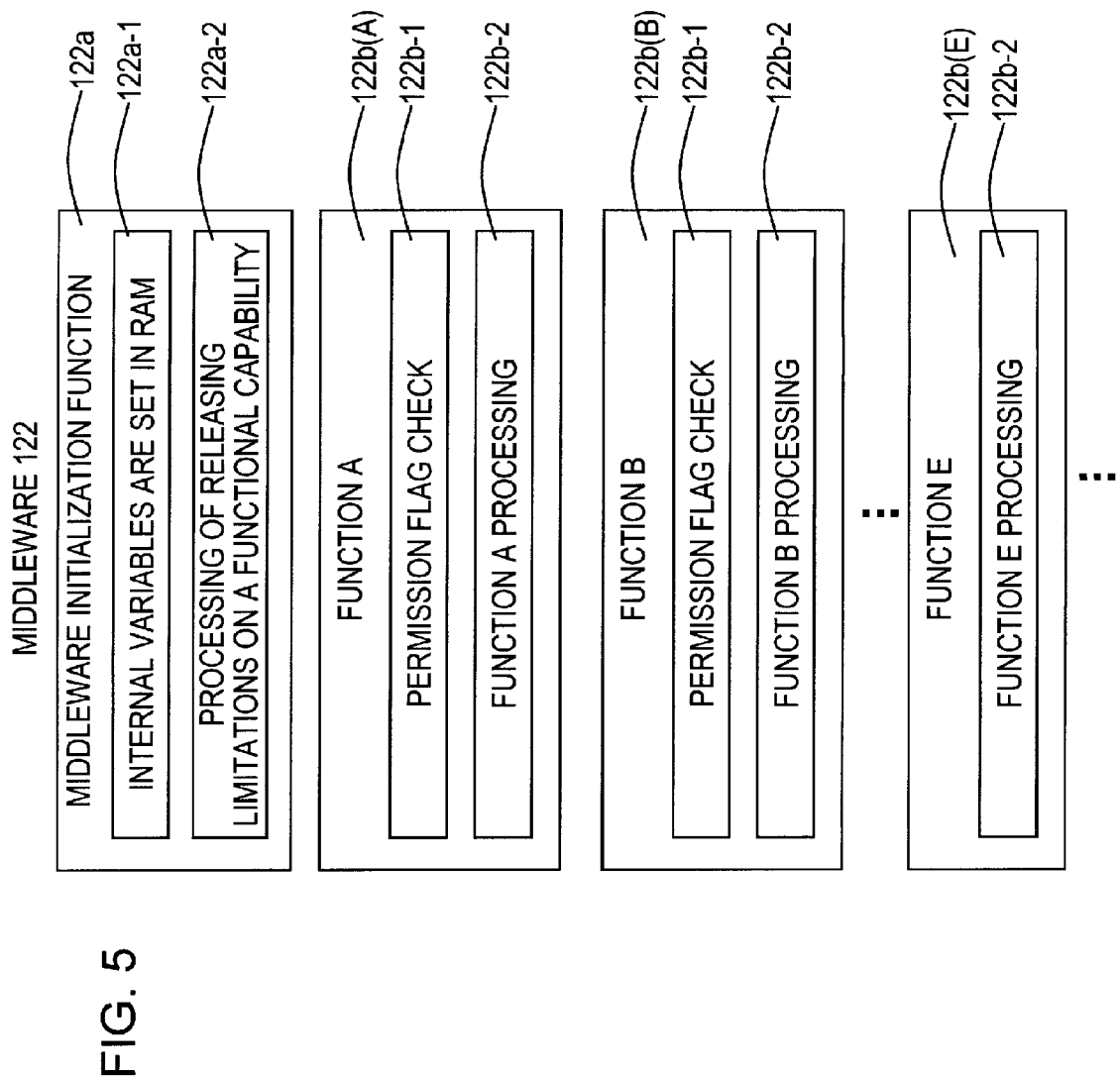
FIG. 5 is a diagram illustrating the example of the configuration of the middleware of the embodiment.

FIG. 5 is a diagram illustrating the example of the configuration of the middleware of the embodiment. As is schematically described in FIG. 3, the middleware 122 includes the middleware initialization function 122a, the middleware function group 122b that is called by the application 121, and the driver group, not illustrated in FIG. 5, to call the OS functional capabilities.

The middleware initialization function 122a includes processing 122a-1, wherein the stored area of internal variables of the middleware such as the data 131 in the middleware is obtained in the RAM 20, and the initial values of the internal variables are stored in the stored are of the RAM 20, and processing 122a-2 of releasing the limitations on functional capabilities. In order to utilize the predetermined functional capability of the microcomputer, the application 121 calls the middleware function corresponding to the predetermined functional capability and executes the middleware function. Accordingly, partial or entire limitation on the functional capabilities is achieved merely by putting the functions to be limited into a non-executable state. Also, the processing of releasing the limitations on functional capabilities is achieved merely by putting the functions to be limited into an executable state. A specific method will be described later.

The function A (122b (A)) includes permission flag check processing 122b-1 in which it is determined whether the function is executable, and function-A processing 122b-2. The function B (122b (B)) is similar to the function A (122b (A)). That is, the functions A and B are exemplified as a function for which the functional capabilities are limited and released. In contrast, a function E (122b (E)) does not include the permission flag check processing, but includes function-E processing 122b-2. That is, the function E is exemplified as a function for which the functional capabilities are unable to be limited.

In order to allow the functions A and B of the middleware to limit the functional capabilities, in the processing 122a-2 of releasing the limitations on functional capabilities, for example, it is determined whether the password PW set in the authentication register corresponds to a right-answer password PW included in the data 131 in the middleware. When the password PW set in the authentication register agrees with the right-answer password PW, the permission flag of the function is put into a permitted state (ON). When the password PW set in the authentication register does not agree with the right-answer password PW, the permission flag of the function is put into a non-permitted state (OFF). Accordingly, the processing 122a-2 of releasing the limitations on functional capabilities includes both the processing of limiting functional capabilities and the processing of releasing the limitations on functional capabilities.

On the other hand, in FIG. 5, the functions A and B, the functional capabilities of which is able to be limited, include the permission flag check processing 122b-1 prior to the processing 122b-2 of the functions A and B. Accordingly, when the functions A and B are called by the application, according to the permission flag check processing, it is determined whether or not the execution of the function is permitted by the processing 122a-2 of releasing the limitations on functional capabilities in the middleware initialization function 122a. In the case of the non-permitted state (permission flag is OFF), an error is returned, thereby making the function non-executable. In contrast, in the case of the permitted state (permission flag is ON), the function is executed.

Figure 6:
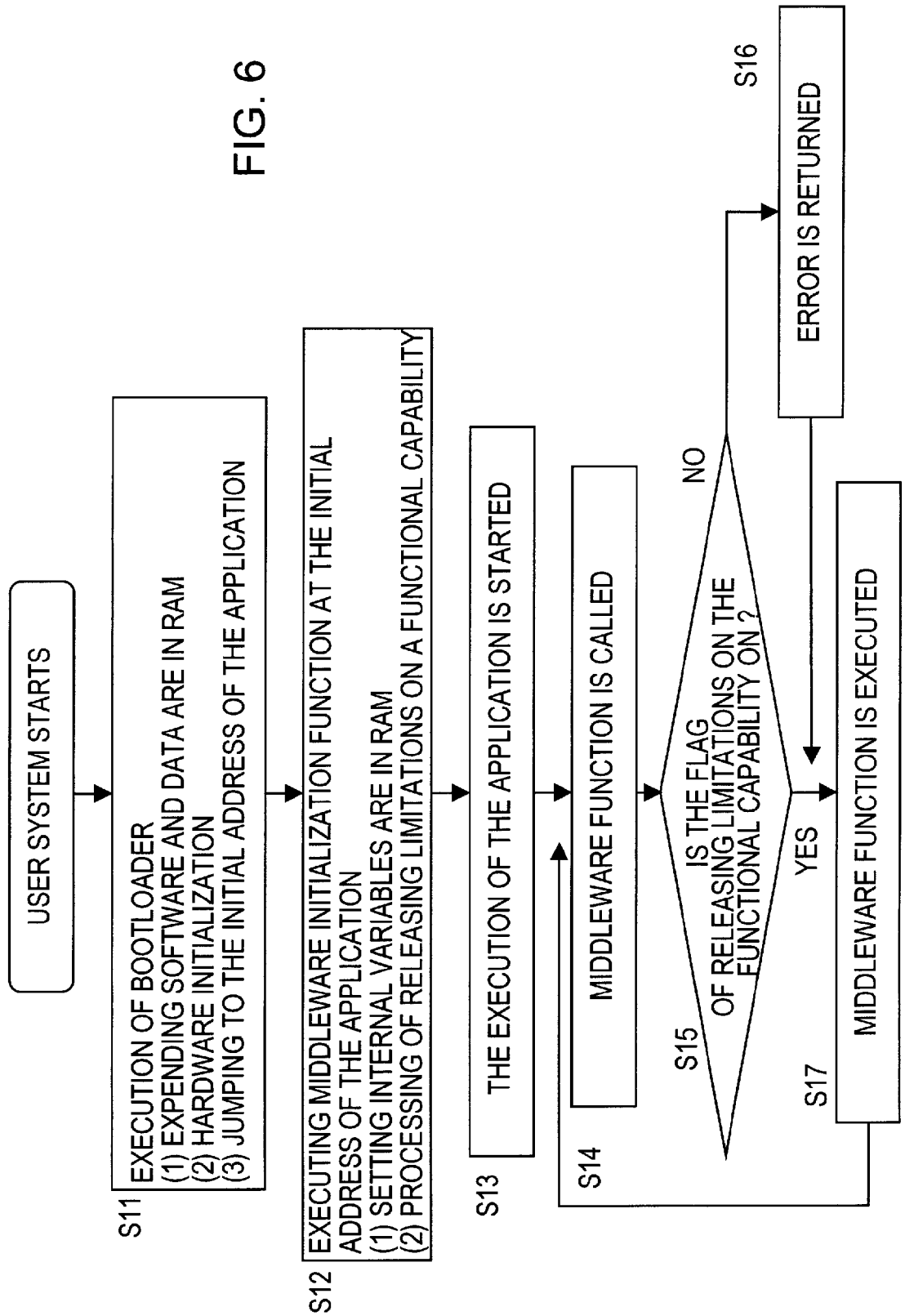
FIG. 6 is a flowchart illustrating the part of the processing of a user system.

FIG. 6 is a flowchart illustrating the part of the processing of a user system. Herein, the user system means a microcomputer in which an application that is being developed or has been developed by the user and an initial value data corresponding to the application are stored in the ROM. Accordingly, the user system includes both the microcomputer at the evaluation stage and the mass-produced microcomputer.

Upon the activation of the microcomputer, the CPU 30 executes the bootloader 11 (S11). The bootloader 11 performs (1) the processing in which the software 12 and the data 13 in the ROM 10 are copied or expanded in the RAM 20, (2) the hardware initialization processing for setting the hardware initial value data 132 in the data 13 in the register at the corresponding address, and (3) the processing of jumping to the initial address of the application.

Figure 7:
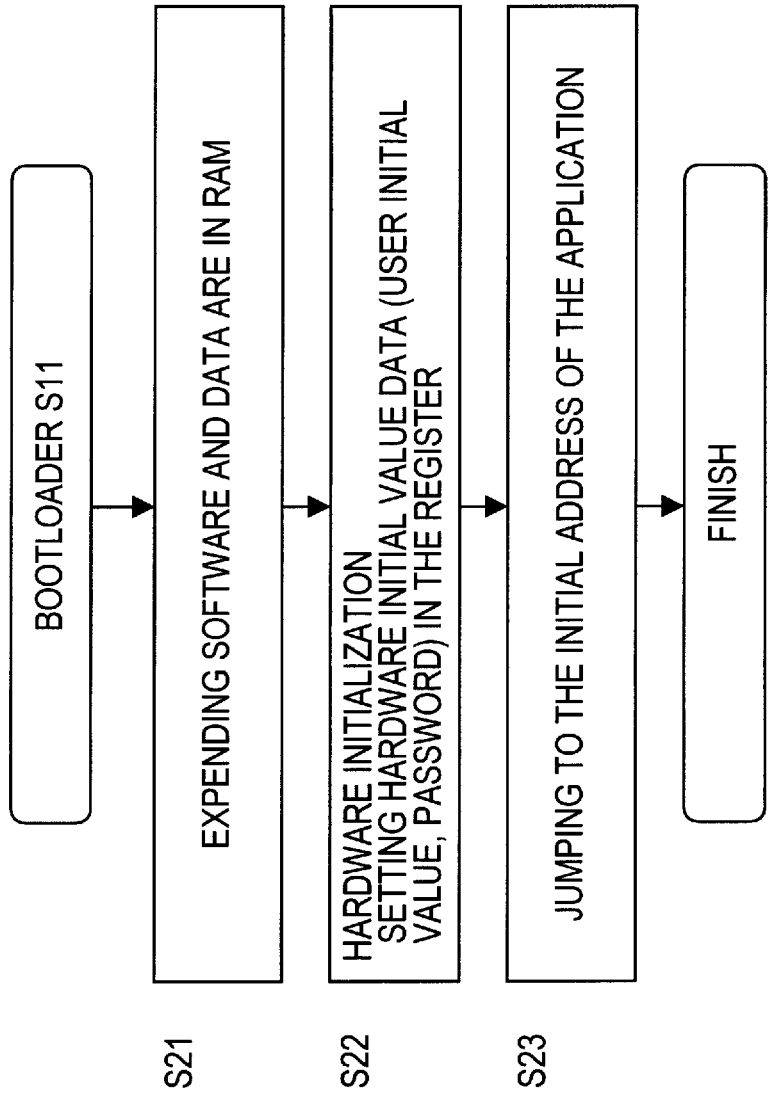
FIG. 7 is a flowchart illustrating the processing performed by the bootloader 11.

FIG. 7 is a flowchart illustrating the processing performed by the bootloader 11. As is described above, first, the CPU 30 executes the bootloader 11, thereby expanding the software 12 and the data 13 in the ROM 10, in the RAM 20 (S21). In this case, it may be such that the software 12 and the data 13 in the ROM 10 are not expanded in the RAM 20. Then, the bootloader 11 performs the hardware initialization processing (S22). In the hardware initialization processing, in accordance with the hardware initial value data 132 illustrated in FIG. 3, the user initial values D1 and D4 are set at the register addresses REG-ADD1 and REG-ADD4 and the passwords PWa and PWb are respectively set at the authentication register addresses REG-ADDa and REG-ADDb. When the passwords and the authentication register addresses are not included in the hardware initial value data 132, the setting for the passwords in the authentication register is not carried out in the hardware initialization processing.

The data 131 of the aforementioned middleware includes the authentication register addresses and the right-answer passwords with respect to all the functions for which the functional capabilities are able to be limited, and the vendor provides all the users with the entire authentication information as part of the library. However, the information to be provided is executable binary data (machine language), so that it is significantly difficult for the users to recognize the authentication register addresses and the right-answer passwords in the library.

In contrast, the vendor provides the user, who are permitted to release the limitations on functional capabilities, with the right-answer passwords and the address of the authentication register addresses regarding the right-answer passwords corresponding to the functions targeted for the release of the limitation, besides the aforementioned library. Before the conclusion of the licensing agreements, passwords and the authentication register addresses regarding the passwords corresponding to the functions, of which the functional capabilities are not limited, are provided for the user by the vendor.

Also, after the conclusion of the licensing agreements, passwords and the authentication register addresses regarding the passwords corresponding to the functions, of which the functional capabilities are limited, are provided for the user by the vendor. Accordingly, the user is able to include the authentication register addresses and the passwords in the hardware initial value data. As a result, according to the later-described processing of releasing the limitations on functional capabilities, the corresponding function of the middleware is put into an executable state.

Lastly, the bootloader 11 performs the processing of jumping to the initial address of the application 121 (S23). As is described in FIGS. 3 and 4, the command to call the middleware initialization function is provided at the initial address of the application 121, so that the middleware initialization function is executed by the CPU 30. It is noted that the application 121 is normally a program that is being developed or has been developed by the user.

FIGS. 8A and 8B are diagrams illustrating the hardware register group and the hardware initialization processing. FIG. 8A illustrates the example of the register address REG-ADD of the hardware register group and the data DATA stored at the register address. This example illustrates seven sets of registers whose register addresses REG-ADD are respectively represented as ADD1 to ADD3 and ADDa to ADDd, wherein the number of bits of each register, for example, is 32 bits.

Then, the area of the entire 32 bits of the registers whose register addresses are ADD1 to ADD3 is an initial value setting area in which the initial value made up of 32 bits is set in the hardware initialization processing. In contrast, the area of higher-order 16 bits of the registers whose register addresses are ADDa and ADDc is an initial value setting area in which the initial value made up of 16 bits is set, and the initial value is not set in the area of lower-order 16 bits of the registers, or at least, arbitrary data may be stored until the execution of the middleware initialization function is completed. Similarly, the initial value is not set in the area of the entire 32 bits of the registers whose register addresses are ADDb and ADDd, or at least, arbitrary data may be stored until the execution of the middleware initialization function is completed.

That is, the partial area of the register addresses ADDa and ADDc and the entire area of the register addresses ADDb and ADDd are a sort of redundant register, in which an arbitrary data may be stored until the completion of the middleware initialization function. Accordingly, in the embodiment, the vendor arbitrary selects an area of these redundant registers as an authentication register. Then, when the authentication register addresses and the passwords are included in the hardware initial value data 132, the passwords PW are set in the authentication register as an initial value, along with other normal registers, in the course of the hardware initialization processing at the time of activation of the microcomputer.

As one example of the hardware initialization processing, FIG. 8B illustrates a state where user initial values in the hardware initial value data 132 (for example, data D1 and D4 in FIG. 3) and the passwords PW (for example, passwords PWa and PWb in FIG. 3) are set in the corresponding registers of the register address REG-ADD. The passwords Pwa, PWb corresponding to the function A are divided in two (PWa and PWb) and respectively set to the lower-order 16 bits of the register of the address ADDa and the higher-order 16 bits of the register of the address ADDb, which are two areas selected from the redundant registers represented as "arbitrary" in the data area of the registers in FIG. 8B.

Besides the aforementioned area, the area of the authentication register may be made up of the entire bit area in one register in which the initial value is not set. In this case, one password is set in the entire bit area in the one register. Further, the area of the authentication register may be made up of part of bit area, where the initial value is not set, in one register. In this case, one password to be set is divided into the bit areas of the plurality of registers.

Thus, the vendor selects the register area arbitrarily selected from the redundant registers and the redundant register areas as the authentication register. When the authentication information is provided for only the user who is permitted to release the limitations on functional capabilities, the user allows the hardware initial value data to include the authentication information (authentication register addresses and authentication data (passwords)). As a result, the passwords are set in the authentication register through the hardware initialization processing performed by the bootloader at the time of activation of the microcomputer.

As is described above, after the passwords are set in the authentication register through the hardware initialization processing, the middleware initialization function is called, whereby the CPU executes the middleware initialization processing as follows.

The processing returns to FIG. 6, and the middleware initialization function, which is allocated to the initial address of the application which is jumped from the bootloader, is called and executed by the CPU (S12). The middleware initialization function 122a is executed by the CPU, (1) whereby the areas of the internal variables such as the data 131 in the middleware are secured in the RAM 20 and, when there exists the initial value of the internal variable, the initial value is set in the area of the RAM 20, (2) and further, the processing of releasing the limitations on functional capabilities is performed.

FIG. 9 is a flowchart of the processing of releasing the limitations on functional capabilities in the embodiment. The processing of releasing the limitations on functional capabilities is executed by the CPU, whereby performing the authentication processing for all the functions for which the functional capabilities is able to be limited. Incidentally, a non-executable state (OFF) is set for all the functions, for which the functional capabilities is able to be limited, as a default value. The processing of releasing the limitations on functional capabilities is executed by the CPU, first, whereby referring to the authentication register addresses REG-ADDa and REG-ADDb and the right-answer passwords PWa and PWb of the data 131 in the middleware in the data 13 in the ROM or the RAM (S31). Subsequently, in the processing of releasing the limitations on functional capabilities, the passwords PWa and PWb at the authentication register addresses REG-ADDa and REG-ADDb are read out (S32). That is, in the processing of releasing the limitations on functional capabilities, the passwords set in the authentication register in the hardware are read out based on the authentication register address, which the vendor selects in advance, in the data 131 in the middleware. Then, in the processing of releasing the limitations on functional capabilities, the passwords corresponding to respective authentication register addresses are compared, thereby performing the authentication processing for the passwords (S34).

Then, in the processing of releasing the limitations on functional capabilities, when the passwords are matched, the authentication is successfully permitted (S35, YES), and a functional capability limitation release flag is turned on, which puts the function into an executable state. When the passwords do not match with each other, the authentication is unsuccessfully permitted (S35, NO), the functional capability limitation release flag is held in an off state, which keeps the function in a non-executable state.

The processing of releasing the limitations on functional capabilities is executed by the CPU, thereby the aforementioned authentication processing is repeated until the authentication processing is completed to all the functions for which the functional capabilities can be limited (S36).

According to the aforementioned processing of releasing the limitations on functional capabilities, when the authentication information regarding the function for releasing the limitations on functional capabilities (authentication address and authentication data (passwords)) is included in the hardware initial value data 132 in the data 13, the function is put into an executable state (the functional capability limitation release flag is turned on). When the authentication information regarding the function for releasing the limitations on functional capabilities is not included in the hardware initial value data 132, the function is put into a non-executable state (the functional capability limitation release flag is turned off). That is, the microcomputer of the user to which the authentication information is provided is able to execute the functions corresponding to the provided authentication information and utilize the functional capabilities corresponding the executed functions.

Accordingly, the vendor limits the functional capabilities of arbitrary functions for the user by not providing the authentication information of the functions and releases the limitation on the functional capabilities of arbitrary functions for the user merely by providing the authentication information of the functions. Moreover, the authentication information includes the authentication register address, in addition to the passwords, thereby maintaining higher security.

The processing returns to FIG. 6 again, and the application is executed by the CPU (S13), and the middleware function in the application is called (S14), and when the functional capability of the middleware function is able to be limited, the permission flag check processing is performed as illustrated in FIG. 5 (S15). When, in the processing of releasing the limitation on functional capabilities in the aforementioned middleware initialization functions, the authentication is successfully permitted and so the functional capability limitation release flag is turned on (S15, YES), such function is put into the executable state, so that the function is able to be executed (S17). With regards to the function for which the authentication is not permitted (S15, NO), an error is returned, and the function is not executed (S16).

Thus, out of the functions that are called from the application and realize a predetermined functional capability, the function whose functional capability is able to be limited is executed, when the correct password is set in the authentication register in the hardware initialization processing. When the password of the function is not set in the authentication register, that is, when the data in the authentication register is not a correct password, the execution of the function is refused.

Then, the aforementioned processing S14, S15, S16, and S17 are repeated during the execution of the application.

Figure 10:
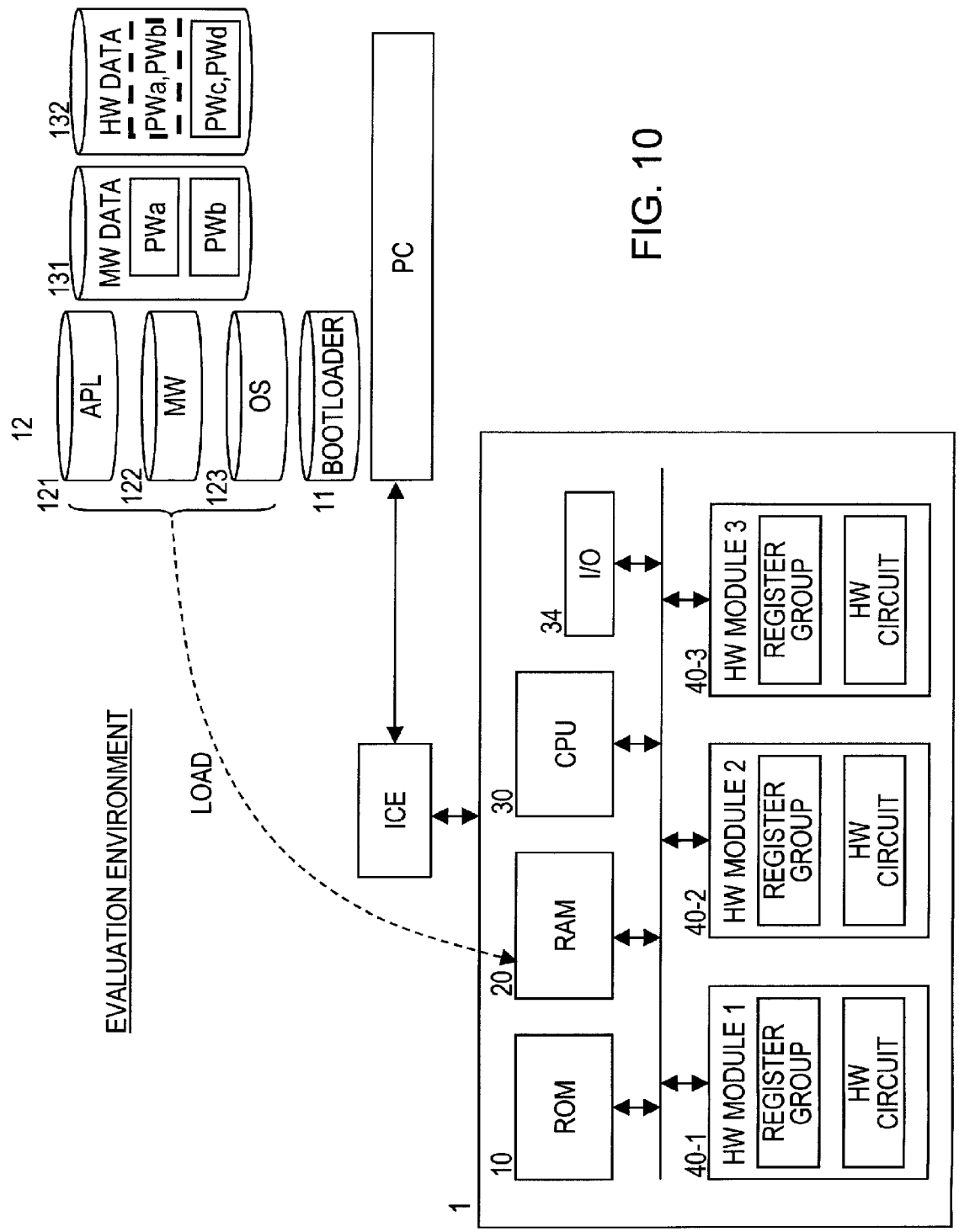
FIG. 10 is a diagram to describe the evaluation environment of the microcomputer according to the embodiment.

FIG. 10 is a diagram to describe the evaluation environment of the microcomputer according to the embodiment. The microcomputer 1 to be evaluated includes the ROM 10, the RAM 20, the CPU 30, the I/O 34, the hardware modules 40-1, 40-2, and 40-3 as the microcomputer for mass production, and further includes an interface circuit, which is not illustrated, connected with the in-circuit emulator ICE. The microcomputer 1 to be evaluated is connected with the personal computer PC via the in-circuit emulator ICE, thereby establishing communications with the personal computer.

In the user's evaluation environment, the CPU 30 executes the bootloader 11 from the personal computer PC via the in-circuit emulator ICE, and the application 121, the middleware 122, the OS 123, the data 131 in the middleware, and the hardware initial value data 132 are expanded, for example, in the RAM 20 in the microcomputer 1 from the personal computer PC via the in-circuit emulator ICE. However, the bootloader 11 may expand part of the programs such as the application 121, the middleware 122, the OS 123, the data 131, and the hardware initial value data 132 from the ROM 10. That is, the bootloader 11 is developed by the user, and the bootloader is executed, thereby expanding the programs or the data in the RAM 20 in the microcomputer 1, as the user desires.

In this evaluation environment, the vendor provides the user with the library that includes the middleware 122 and the corresponding data 131, the authentication information PWc and PWd on the functions for which the functional capabilities are not limited, and appropriately the OS 123. Therefore, the user allows to include the authentication register address and the password in the hardware initial value data 132 based on the provided authentication information PWc and PWd. On the other hand, the vendor does not provide the user with the authentication information PWa and PWb on the functions for which the functional capabilities are limited. As a result, the user is unable to allow to include the authentication register address and the password in the hardware initial value data 132 based on the authentication information PWa and PWb. Accordingly, in FIG. 10, the authentication information PWa and PWb is not included in the hardware initial value data 132, as illustrated in a dashed line.

The authentication information PWa and PWb includes the authentication register addresses, in addition to the password, which is the authentication data. The user for whom the authentication information is not provided is unable to find the authentication register which is arbitrarily selected by the vendor from the magnitude of registers, and it is significantly difficult for the user to release the limitations on functional capabilities.

Figure 11:
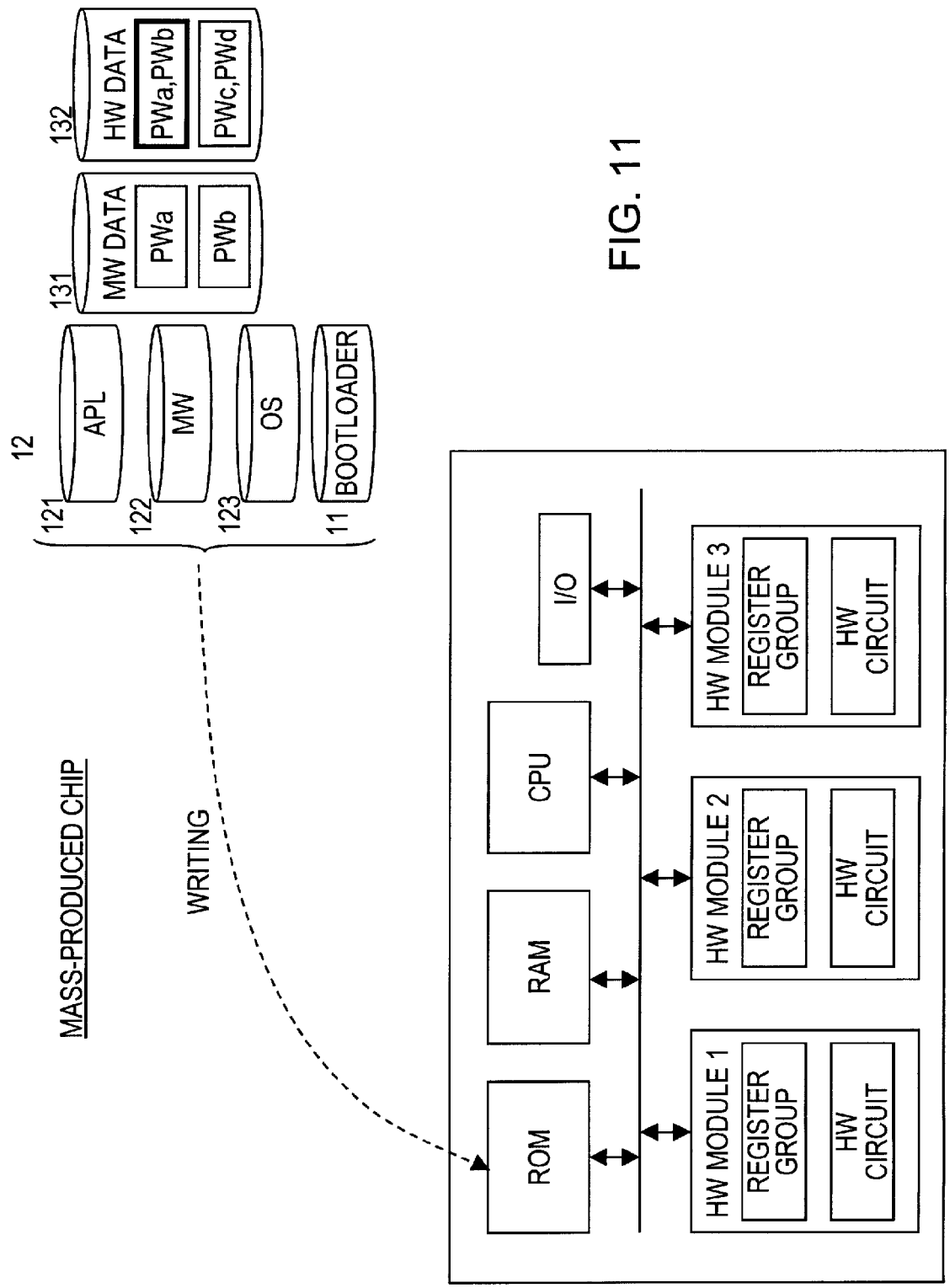
FIG. 11 is a diagram to describe the mass-produced chips of the microcomputer of the embodiment.

FIG. 11 is a diagram to describe the mass-produced chips of the microcomputer of the embodiment. As is illustrated in FIG. 2, the microcomputer 1 for mass production includes the ROM 10, the RAM 20, the CPU 30, the I/O 34, the hardware modules 40-1, 40-2, and 40-3. Then, the vendor provides the user, who concludes the licensing agreements, with the authentication information PWa and PWb on the functions for which the functional capabilities have been limited at the evaluation stage. As a result, the user allows to include the authentication information PWa and PWb in the hardware initial value data 132 based on the provided authentication information (authentication address and authentication data (password)).

Then, the user stores the OS, the application 121 that has been developed, the bootloader 11, and the hardware initial value data 132 inclusive of the authentication information PWa and PWb which is newly provided, in the ROM 10 in the mass-produced chips of the microcomputer 1, in addition to the middleware 122 and the corresponding data 131 which have already been provided by the vendor at the evaluation stage.

Accordingly, the mass-produced microcomputer 1 is able to execute the function for which the limitations on a functional capability are released, thereby using the corresponding functional capability.

As is described above, according to the embodiment, the vendor provides the user with the library that includes the middleware and the corresponding data and does not provide the user with the authentication information on the functions to be limited. Accordingly, the user evaluates the microcomputer and the library in a state where part of the functional capabilities are limited. Then, the authentication information to release the limitations on functional capabilities is provided for the user who concludes the licensing agreements. Consequently, the limitations on functional capabilities are released for the user. Moreover, the authentication information includes not only the passwords for releasing the limitations on functional capabilities but also the authentication register address at which the passwords are set, so that it is significantly difficult for users to release the limitations on functional capabilities, whereby maintaining high security.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A microcomputer comprising: a processing unit; a plurality of registers; and a storage medium configured to store hardware initialization data that includes an initial value and an initialization register address of an initialization register in which the initial value is set, the initialization register is a part of the plurality of registers, the processing unit being configured to perform a process including:
   setting the initial value in the initialization register having the initialization register address based on the hardware initialization data, and setting, when the hardware initialization data includes a first authentication data and a first register address of a first register in which the first authentication data is to be set, the first authentication data in the first register having the first register address;
   performing a functional capability limitation releasing processing which includes:
      determining, based on an authentication information which includes a second register address of an authentication register, which is selected in advance from the plurality of registers excluding the initialization register, and a second authentication data, whether data stored in the authentication register having the second register address is matched with the second authentication data, and
      putting a function corresponding to the authentication information into an executable state when the data stored in the authentication register is matched with the second authentication data; and
   executing the function which is put into the executable state to realize the functional capability of the executed function.

2. The microcomputer according to claim 1, the processing unit further being configured to perform a process including:
   calling the function by an application, and
   wherein, after the performing processing of setting the first authentication data in the first register, and before the calling the function, the functional capability limitation releasing processing is executed.

3. The microcomputer according to claim 1, wherein
when the data stored in the authentication register is matched with the second authentication data, a permission flag of the function is put into a permitted state, thereby putting the function into an executable state, and when the function is called by an application, whether the permission flag is in the permitted state is determined and, when the permission flag is in the permitted state, the processing of realizing the desired functional capability of the called function is executed, and when the permission flag is not in the permitted state, the processing of realizing the desired functional capability of the called function is not executed.

4. A non-transitory storage medium for storing a program of middleware which is executable by a microcomputer which includes a processing unit; a plurality of registers; and a storage medium configured to store hardware initialization data that includes an initial value and an initialization register address of an initialization register in which the initial value is set, the initialization register is a part of the plurality of registers, the program being configured to cause the processing unit to perform a process comprising:

setting the initial value in the initialization register having the initialization register address based on the hardware initialization data, and setting, when the hardware initialization data includes a first authentication data and a first register address of a first register in which the first authentication data is to be set, the first authentication data in the first register having the first register address;

determining, based on an authentication information which includes a second register address of an authentication register, which is selected in advance from the plurality of registers excluding the initialization register, and a second authentication data, whether data stored in the authentication register having the second register address is matched with the second authentication data;

putting a function corresponding to the authentication information into an executable state when the data stored in the authentication register is matched with the second authentication data; and executing the function which is put into the executable state to realize the functional capability of the executed function.

5. The non-transitory storage medium for storing the program of the middleware according to claim 4, the program further being configured to cause the processing unit to perform a process including:

calling the function by an application, and wherein after the setting the first authentication data in the first register, and before the calling the function, the functional capability limitation releasing processing is executed.

6. A method of operating a microcomputer which includes a processing unit; a plurality of registers; and a storage medium configured to store hardware initialization data that includes an initial value and an initialization register address of an initialization register in which the initial value is set, the initialization register is a part of the plurality of registers, the method comprising:

a hardware initializing, by the processing unit, to set the initial value in the initialization register having the initialization register address based on the hardware initialization data and to set, when the hardware initialization data includes a first authentication data and a first register address of a first register in which the first authentication data is to be set, the first authentication data in the first register having the first register address;

a functional capability limitation releasing processing, by the processing unit, to determine, based on an authentication information which includes a second register address of an authentication register, which is selected in advance from the plurality of registers excluding the initialization register, and a second authentication data, whether data stored in the authentication register having the second register address is matched with the second authentication data, and to put a function corresponding to the authentication information into an executable state when the data stored in the authentication register is matched with the second authentication data; and executing the function which is put into the executable state to realize the functional capability of the executed function.

7. The method of operating the microcomputer according to claim 6, the method further comprising:

calling the function by an application, and wherein the functional capability limitation releasing processing is executed, after the hardware initializing, and before the calling the function.

* * * * *